(12) United States Patent
Hosoe et al.

(10) Patent No.: US 9,484,570 B2
(45) Date of Patent: Nov. 1, 2016

(54) METHOD FOR PRODUCING ELECTRODE FOR ELECTROCHEMICAL ELEMENT

(71) Applicants: SUMITOMO ELECTRIC INDUSTRIES, LTD., Osaka-shi, Osaka (JP); SUMITOMO ELECTRIC TOYAMA CO., LTD., Imizu-shi, Toyama (JP)

(72) Inventors: Akihisa Hosoe, Osaka (JP); Kazuki Okuno, Osaka (JP); Hajime Ota, Osaka (JP); Koutarou Kimura, Osaka (JP); Kengo Goto, Osaka (JP); Junichi Nishimura, Imizu (JP); Hideaki Sakaida, Osaka (JP)

(73) Assignees: SUMITOMO ELECTRIC INDUSTRIES, LTD., Osaka-shi, Osaka (JP); SUMITOMO ELECTRIC TOYAMA CO., LTD., Imizu-shi, Toyama (JP)

( * ) Notice: Subject to any disclaimer, the term of this patent is extended or adjusted under 35 U.S.C. 154(b) by 447 days.

(21) Appl. No.: 13/969,098

(22) Filed: Aug. 16, 2013

(65) Prior Publication Data

US 2013/0333209 A1 Dec. 19, 2013

Related U.S. Application Data

(63) Continuation of application No. 13/557,442, filed on Jul. 25, 2012, now Pat. No. 8,528,375, which is a continuation of application No. PCT/JP2012/053652, filed on Feb. 16, 2012.

(30) Foreign Application Priority Data

| Feb. 18, 2011 | (JP) | 2011-033416 |
| May 19, 2011 | (JP) | 2011-112800 |
| Jan. 13, 2012 | (JP) | 2012-005607 |

(51) Int. Cl.
*H01M 4/04* (2006.01)
*H01M 4/139* (2010.01)
(Continued)

(52) U.S. Cl.
CPC ............ *H01M 4/0435* (2013.01); *H01M 4/04* (2013.01); *H01M 4/043* (2013.01);
(Continued)

(58) Field of Classification Search
CPC .... H01M 4/04; H01M 4/043; H01M 4/0435; H01M 4/0473; H01M 4/0478; H01M 4/80; H01M 4/139; H01M 4/0409; H01L 41/047; H01L 41/29
See application file for complete search history.

(56) References Cited

U.S. PATENT DOCUMENTS

| 2,404,824 A | 7/1946 | Booe |
| 2,582,744 A | 1/1952 | Brennan |

(Continued)

FOREIGN PATENT DOCUMENTS

| JP | 9-143510 | 6/1997 |
| JP | 2001-143702 | 5/2001 |

(Continued)

OTHER PUBLICATIONS

Machine translation of JP 9-143510A; Oct. 16, 2016.*

(Continued)

*Primary Examiner* — Edward Tolan
(74) *Attorney, Agent, or Firm* — Drinker Biddle & Reath LLP

(57) ABSTRACT

It is an object of the present invention to provide a method for producing an electrode for an electrochemical element, which can easily adjust a capacity and can produce the electrochemical element at low cost. The method for producing an electrode for an electrochemical element of the present invention includes a thickness adjustment step of compressing an aluminum porous body having continuous pores to adjust the thickness of the aluminum porous body to a predetermined thickness, and a filling step of filling the aluminum porous body, the thickness of which is adjusted, with an active material.

4 Claims, 8 Drawing Sheets

(51) Int. Cl.
*H01M 4/66* (2006.01)
*H01M 4/80* (2006.01)
*H01M 10/052* (2010.01)

(52) U.S. Cl.
CPC ....... *H01M 4/0409* (2013.01); *H01M 4/0473* (2013.01); *H01M 4/139* (2013.01); *H01M 4/661* (2013.01); *H01M 4/80* (2013.01); *H01M 10/052* (2013.01); *Y02E 60/122* (2013.01); *Y02P 70/54* (2015.11); *Y02T 10/7011* (2013.01); *Y10T 29/49204* (2015.01); *Y10T 29/49224* (2015.01)

(56) References Cited

U.S. PATENT DOCUMENTS

| | | | |
|---|---|---|---|
| 2,584,980 A | | 2/1952 | Brennan |
| 2,965,513 A | | 12/1960 | Brennan |
| 3,184,840 A | | 5/1965 | Byrne et al. |
| 3,197,382 A | * | 7/1965 | Zambrow ................ 376/432 |
| 3,475,811 A | * | 11/1969 | Clarke et al. ............ 228/159 |
| 4,887,349 A | * | 12/1989 | Kambayashi ........... H01M 4/04 118/114 |
| 5,344,724 A | * | 9/1994 | Ozaki et al. ................ 429/94 |
| 5,508,114 A | * | 4/1996 | Sugikawa ............. B22F 3/1109 428/546 |
| 5,514,488 A | * | 5/1996 | Hake et al. ................ 429/122 |
| 5,542,958 A | * | 8/1996 | Furukawa ................ 29/623.1 |
| 5,564,064 A | | 10/1996 | Martin |
| 5,795,680 A | * | 8/1998 | Ikeda et al. .............. 429/245 |
| 6,423,422 B2 | * | 7/2002 | Wada et al. ............... 428/550 |
| 7,037,453 B2 | | 5/2006 | Ament et al. |
| 7,073,265 B2 | * | 7/2006 | Senoo et al. ................ 30/364 |
| 7,236,349 B2 | | 6/2007 | Miyaki et al. |
| 2001/0014999 A1 | | 8/2001 | Matsumura et al. |
| 2007/0002525 A1 | | 1/2007 | Yamanoi et al. |
| 2012/0115035 A1 | * | 5/2012 | Ota ........................ H01M 4/70 429/241 |

FOREIGN PATENT DOCUMENTS

| | | |
|---|---|---|
| JP | 2001-155739 | 6/2001 |
| JP | 2005-285629 | 10/2005 |
| JP | 2009-176516 | 8/2009 |
| JP | 2009-176517 | 8/2009 |
| JP | 2010-009905 A | 1/2010 |
| JP | 2010-040218 A | 2/2010 |

OTHER PUBLICATIONS

U.S. Appl. No. 13/539,583, Hosoe et al.
U.S. Appl. No. 13/557,430, Hosoe et al.
U.S. Appl. No. 13/539,557, Hosoe et al.
U.S. Appl. No. 13/539,573, Hosoe et al.
U.S. Appl. No. 13/483,505, Hosoe et al.
U.S. Appl. No. 13/483,609, Hosoe et al.
U.S. Appl. No. 13/483,626, Hosoe et al.
U.S. Appl. No. 13/569,300, Hosoe et al.
U.S. Appl. No. 13/494,353, Hosoe et al.
U.S. Appl. No. 13/569,319, Hosoe et al.
U.S. Appl. No. 13/470,817, Hosoe et al.
U.S. Appl. No. 13/569,288, Hosoe et al.
U.S. Appl. No. 13/569,322, Hosoe et al.
U.S. Appl. No. 13/569,325, Hosoe et al.
U.S. Appl. No. 13/539,587, Hosoe et al.

\* cited by examiner

METHOD FOR PRODUCING ELECTRODE FOR ELECTROCHEMICAL ELEMENT

This is a continuation application of copending application Ser. No. 13/557,442, having a filing date of Jul. 25, 2012, which is a continuation application under 37 C.F.R. §1.53(b) of prior International Application No. PCT/JP2012/053652, having a filing date of Feb. 16, 2012. The copending application Ser. No. 13/557,442 is incorporated by reference herein in its entirety.

TECHNICAL FIELD

The present invention relates to a method for producing an electrode for an electrochemical element such as a lithium battery (including a "lithium secondary battery"), an electric double layer capacitor, a lithium-ion capacitor and a molten salt battery.

BACKGROUND ART

In recent years, electrochemical elements, such as a lithium battery, an electric double layer capacitor, a lithium-ion capacitor and a molten salt battery, have been widely used as power supplies for portable microelectronics such as mobile phones and laptops, or for electric vehicles (EV).

For these electrochemical elements, generally, an electrode in which a mixture layer containing an active material is formed on a metal foil is used. For example, in the case of a positive electrode for a lithium secondary battery, as shown in FIG. 4, an electrode 31 for a lithium secondary battery, in which positive electrode mixture layers 33 containing a positive electrode active material such as a lithium cobalt oxide ($LiCoO_2$) powder, a binder such as polyvinylidene fluoride (PVDF) and a conduction aid such as a carbon powder are formed on both surfaces of a current collector 32 made of an aluminum (Al) foil, is employed, and such an electrode 31 for a lithium secondary battery is produced by applying a positive electrode mixture in a slurry form obtained through addition and mixing of a solvent onto the current collector 32 made of an aluminum foil and drying the resulting coating film (e.g., Patent Literature 1).

CITATION LIST

Patent Literature

Patent Literature 1: Japanese Unexamined Patent Publication No. 2001-143702

SUMMARY OF INVENTION

Technical Problem

When a capacity is adjusted in conventional electrochemical elements using the electrode described above, a method of adjusting the amount of the active material per a volume of the slurry of the mixture to be filled into the electrode is employed, but there is a problem that production cost is high since slurry conditions need to be adjusted for every specification of the electrode.

In view of the problems of the above-mentioned conventional production method, it is an object of the present invention to provide a method for producing an electrode for an electrochemical element, which can easily adjust a capacity and can produce the electrochemical element at low cost.

Solution to Problem (1) The first is a method for producing an electrode for an electrochemical element, comprising a thickness adjustment step of compressing an aluminum porous body having continuous pores to thereby adjust the aluminum porous body to a predetermined thickness, and a filling step of filling the aluminum porous body, the thickness of which is adjusted, with an active material.

For example, in the case of a conventional electrode for a lithium secondary battery, since it is generally difficult to increase the thickness of the electrode, a method in which a capacity is adjusted by altering the size of the electrode is employed, but various electrodes need to be prepared in accordance with the specification of a battery, and it has not come to solve the problem.

Therefore, the present inventors have made earnest investigations, and consequently come to note that a metal porous body, namely, an aluminum porous body (Al porous body) is used as a current collector. In addition, it has been found that by fixing slurry conditions and altering the thickness of the current collector to adjust the amount of the slurry to be filled, it is unnecessary to change the slurry for every specification of the electrode or to adjust the slurry conditions in accordance with a solvent quantity, and therefore cost can be reduced.

In the method of the above (1), an electrode having a desired capacity can be attained without changing the composition of a slurry containing an active material since the amount of an active material to be filled can be adjusted by performing the thickness adjustment step prior to filling the active material (slurry) into an aluminum porous body having continuous pores. Therefore, an electrode can be produced at low cost.

Moreover, since variations in thickness of the aluminum porous body can be reduced through the thickness adjustment step, variations in capacity can also be reduced.

Further, as described above, in the case of a conventional electrode for a lithium secondary battery, since the capacity is adjusted by altering the size of the electrode, an electrode with a large size is used in the form of many layers of wound electrode to form a cylindrical battery, and a battery pack prepared by combining such cylindrical batteries can not adequately increase a volumetric energy density.

However, a battery pack obtained by combining battery cells prepared by using positive and negative electrodes produced as described above by use of the aluminum porous body can improve the volumetric energy density or can save a space as compared with a conventional battery pack obtained by combining cylindrical batteries. Specifically, for example, when a battery pack having the same volume as that of a conventional battery pack is used, the volumetric energy density can be increased by 1.5 times or more, and when the battery pack is used as an battery pack for automobile use, it becomes possible to increase a cruising distance of an electric vehicle by 1.5 times or more. Further, when a battery pack having the same capacity as that of a conventional battery pack is used, the volume of a battery can be reduced to two-thirds or less.

That is, when conventional cylindrical batteries are combined, the batteries cannot be densely arranged because of a problem of releasing heat or because of restriction of being cylindrical. As a specific example, for example, in the case of a battery pack for automobile use obtained by combining 18650 type cylindrical batteries, a net battery volume remains at about 40% of the volume of the whole battery pack.

In contrast, a battery cell prepared by use of the electrode of the aluminum porous body of the present invention has an excellent heat releasing property because of a small thickness of the cell itself, and the battery cell can be densely arranged because it can be shaped into a rectangular cell.

In accordance with the experiments performed by the present inventors, when a battery pack having the same capacity as that of the battery pack for automobile use, which uses 18650 type cylindrical batteries, is prepared, it can be confirmed that the volume of the battery can be reduced by up to 51%.

Also, the present inventors have confirmed that such an electrode can be applied not only as an electrode for a lithium secondary battery, but also as electrodes for other lithium batteries such as lithium primary batteries and further as electrodes for electrochemical elements such as the electric double layer capacitor, the lithium-ion capacitor and the molten salt battery described above.

(2) The second is the method for producing an electrode for an electrochemical element according to the above (1), comprising a cutting step of cutting the aluminum porous body filled with the active material to a predetermined length after the filling step.

In the method of the above (2), the cutting step of cutting the aluminum porous body to a predetermined length is performed after filling with the active material. The active material can be continuously filled into the aluminum porous body before cutting the aluminum porous body, and therefore production cost can be further reduced.

(3) The third is the method for producing an electrode for an electrochemical element according to the above (1) or (2), wherein in the thickness adjustment step, the thickness of the aluminum porous body is adjusted by roller pressing.

In the method of the above (3), since the thickness of the aluminum porous body is adjusted by roller pressing, it becomes possible to adjust the thickness of the aluminum porous body by only adjusting the position of the roller. Accordingly, production cost can be further reduced.

(4) The fourth is the method for producing an electrode for an electrochemical element according to any one of the above (1) to (3), wherein a drying step of drying the aluminum porous body filled with the active material and a compressing step of compressing the dried aluminum porous body are arranged prior to the cutting step.

In the method for producing an electrode for an electrochemical element, the solvent in the slurry is evaporated by providing a drying step, but if the state after drying the solvent is left as it is, a space where the solvent has been present remains, and the volume of the electrode becomes bulky and the filling density of the active material becomes small. Therefore, by providing the above-mentioned compressing step, the volume of the space remaining within the electrode can be optimized to obtain a high-density electrode. Moreover, the surface of the electrode can be smooth and a risk of short circuit is decreased.

(5) The fifth is the method for producing an electrode for an electrochemical element according to any one of the above (1) to (4), wherein the aluminum porous body is an aluminum porous body in which the oxygen amount of its surface, quantified at an accelerating voltage of 15 kV by using energy dispersive X-ray analysis (EDX analysis), is 3.1 mass % or less.

If the aluminum porous body is heated in the environment where oxygen is present in a production step, oxidation of aluminum easily proceeds to produce an oxide film at the surface of the porous body. In the case of an aluminum porous body having an oxide film formed thereon, since the entire surface area cannot be effectively utilized, an adequately large amount of the active material cannot be supported and contact resistance between the active material and the aluminum porous body cannot be reduced.

In view of such a situation, the present inventors have developed a method for producing an aluminum porous body without heating aluminum in the environment where oxygen is present. Accordingly, it becomes possible to obtain an aluminum porous body having a little oxygen amount at the surface, that is, an aluminum porous body having a little amount of an oxide film at the surface.

Specifically, by heating a resin foam provided with an aluminum layer formed thereon and having continuous pores to a temperature of the melting point of aluminum or less in a state being immersed in a molten salt while applying a negative potential to the aluminum layer to decompose the resin foam, it is possible to obtain an aluminum porous body in which an oxygen amount of its surface, quantified at an accelerating voltage of 15 kV by using EDX analysis, is 3.1 mass % or less.

Then, by using such an aluminum porous body, the amount of the active material to be supported can be increased and contact resistance between the active material and the aluminum porous body can be maintained at a low level, and therefore the availability ratio of the active material can be improved.

Advantageous Effects of Invention

In accordance with the present invention, it is possible to provide a method for producing an electrode for an electrochemical element, which can easily adjust a capacity and can produce the electrochemical element at low cost. Further, it is possible to provide an electrode for an electrochemical element, which is suitable for producing a battery pack capable of improving a volumetric energy density or saving a space.

DESCRIPTION OF EMBODIMENTS

Hereinafter, the present invention will be described based on embodiments of the present invention with reference to the drawings. In the following description, first, a method for producing an electrode for an electrochemical element will be described, and then a lithium battery, an electric double layer capacitor, a lithium-ion capacitor and a molten salt battery, respectively using the electrode for an electrochemical element, will be described.

[A] Electrode for Electrochemical Element

First, in a method for producing an electrode for an electrochemical element, a method for producing an aluminum porous body will be described, and then the method for producing an electrode for an electrochemical element using the aluminum porous body will be described, taking the preparation of an electrode for a lithium secondary battery as an example.

1. Production of Aluminum Porous Body

Figure 1A:
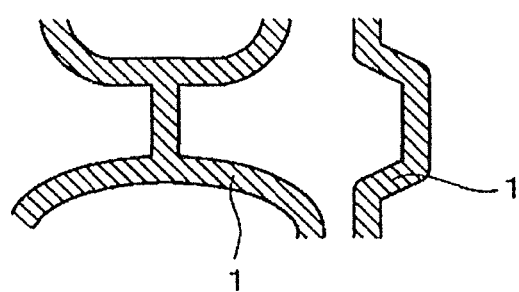
FIGS. 1A, 1B and 1C are views illustrating an example of a method for producing an aluminum porous body in the present invention.
Figure 1B:
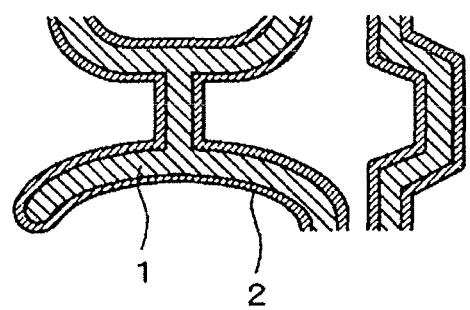
Figure 1C:
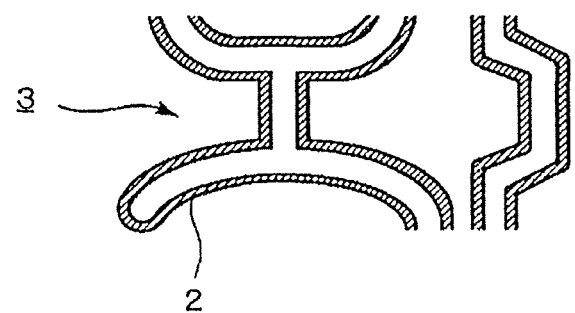

First, a method for producing an aluminum porous body that is used for the electrode for an electrochemical element of the present invention will be described. FIGS. 1A, 1B and 1C are views illustrating an example of a method for producing an aluminum porous body, and they are views schematically showing the formation of an aluminum structure (porous body) using a resin molded body as a core material.

First, a preparation of a resin molded body serving as a base material is performed. FIG. 1A is an enlarged schematic view showing a part of a cross-section of a resin foam molded body having continuous pores as an example of a resin molded body serving as a base material, and it shows a state in which pores are formed in the skeleton of a resin foam molded body 1. Next, a conductive treatment of the surface of the resin molded body is performed. Through this step, a thin conductive layer made of an electric conductor is formed on the surface of the resin foam molded body 1. Subsequently, aluminum plating in a molten salt is performed to form an aluminum plated layer 2 on the surface of the conductive layer of the resin molded body (FIG. 1B). Thereby, an aluminum structure is obtained in which the aluminum plated layer 2 is formed on the surface of the resin molded body serving as a base material. Thereafter, the resin foam molded body 1 can be removed by decomposition or the like to obtain an aluminum structure (porous body) 3 containing only a remaining metal layer (FIG. 1C). Hereinafter, each of these steps will be described in turn.

(1) Preparation of Resin Molded Body

First, as a resin molded body serving as a base material, a porous resin molded body having a three-dimensional network structure and continuous pores is prepared. A material of the resin molded body may be any resin. As the material, a resin foam molded body made of polyurethane, melamine resin, polypropylene or polyethylene can be exemplified. Though the resin foam molded body has been exemplified, a resin molded body having any shape may be selected as long as the resin molded body has continuous pores. For example, a resin molded body having a shape like a nonwoven fabric formed by tangling fibrous resin can be used in place of the resin foam molded body.

The resin molded body preferably has continuous pores with a porosity of 40 to 98% and a cell diameter of 50 to 1000 μm, and more preferably continuous pores with a porosity of 80% to 98% and a cell diameter of 50 μm to 500 μm. Urethane foams and melamine resin foams have a high porosity, continuity of pores, and excellent decomposition properties and therefore they can be preferably used as the resin molded body. Urethane foams are preferred in points of uniformity of pores, easiness of availability and the like, and preferred in that urethane foams with a small pore diameter can be available.

Resin molded bodies often contain residue materials such as a foaming agent and an unreacted monomer in the production of the foam, and are therefore preferably subjected to a washing treatment for the sake of the subsequent steps. For example, in the urethane foam, a three-dimensional network is configured as a skeleton by the resin molded body, and therefore continuous pores are configured as a whole. The skeleton of the urethane foam has an almost triangular shape in a cross-section perpendicular to its extending direction. Herein, the porosity is defined by the following equation:

$$\text{Porosity [\%]} = (1-(\text{mass of porous body material [g]}/(\text{volume of porous body material [cm}^3\text{]} \times \text{material density}))) \times 100$$

Further, the cell diameter is determined by magnifying the surface of the resin molded body in a photomicrograph or the like, counting the number of pores per inch (25.4 mm) as the number of cells, and calculating an average pore diameter by the following equation: average pore diameter=25.4 mm/the number of cells.

(2) Conductive Treatment of Surface of Resin Molded Body

In order to perform electroplating, the surface of the resin foam (resin molded body) is previously subjected to a conductive treatment. A method of the conductive treatment is not particularly limited as long as it is a treatment by which a layer having a conductive property can be disposed on the surface of the resin foam, and any method, including electroless plating of a conductive metal such as nickel, vapor deposition and sputtering of aluminum or the like, and application of a conductive coating material containing conductive particles such as carbon, may be selected.

As an example of the conductive treatment, a method of making the surface of the resin foam electrically conductive by sputtering of aluminum, and a method of making the surface of the resin foam electrically conductive by using carbon as conductive particles will be described below.

(i) Sputtering of Aluminum

A sputtering treatment using aluminum is not limited as long as aluminum is used as a target, and it may be performed according to an ordinary method. A sputtering film of aluminum is formed by, for example, holding a resin molded body with a substrate holder, and then applying a direct voltage between the holder and a target (aluminum) while introducing an inert gas into the sputtering apparatus to make an ionized inert-gas impinge onto the aluminum target and deposit the sputtered aluminum particles on the surface of the resin molded body. The sputtering treatment is preferably performed below a temperature at which the resin molded body is not melted, and specifically, the sputtering treatment may be performed at a temperature of about 100 to 200° C., and preferably at a temperature of about 120 to 180° C.

(ii) Carbon Application

A carbon coating material is prepared as a conductive coating material. A suspension liquid serving as the conductive coating material preferably contains carbon particles, a binder, a dispersing agent, and a dispersion medium. Uniform application of conductive particles requires maintenance of uniform suspension of the suspension liquid. Thus, the suspension liquid is preferably maintained at a temperature of 20° C. to 40° C.

The reason for this is that a temperature of the suspension liquid below 20° C. results in a failure in uniform suspension, and only the binder is concentrated to form a layer on the surface of the skeleton constituting the network structure of a synthetic resin molded body. In this case, a layer of applied carbon particles tends to peel off, and metal plating firmly adhering to the substrate is hardly formed. On the other hand, when a temperature of the suspension liquid is higher than 40° C., since the amount of the dispersing agent to evaporate is large, with the passage of time of application treatment, the suspension liquid is concentrated and the amount of carbon to be applied tends to vary. The carbon particle has a particle diameter of 0.01 to 5 µm, and preferably 0.01 to 0.5 µm. A large particle diameter may result in the clogging of holes of a porous resin molded body or may interfere with smooth plating, and too small a particle diameter makes it difficult to ensure a sufficient conductive property.

The application of carbon particles to the resin molded body can be performed by dipping the resin molded body to be a subject in the suspension liquid and squeezing and drying the resin molded body. An example of a practical production step is as follows: a long sheet of a strip-shaped resin having a three-dimensional network structure is continuously run out from a supply bobbin, and immersed in the suspension liquid in a bath. The strip-shaped resin immersed in the suspension liquid is squeezed between squeezing rolls so that an excessive suspension liquid is squeezed out. Subsequently, a dispersion medium of the suspension liquid of the strip-shaped resin is removed by hot air ejected from hot air nozzles, and the strip-shaped resin is fully dried and wound around a take-up bobbin. The temperature of the hot air preferably ranges from 40° C. to 80° C. When such an apparatus is used, the conductive treatment can be automatically and continuously performed and a skeleton having a network structure without clogging and having a uniform conductive layer is formed, and therefore, the subsequent metal plating step can be smoothly performed.

(3) Formation of Aluminum Layer: Molten Salt Plating

Next, an aluminum-plated layer is formed on the surface of the resin molded body by electroplating in a molten salt. By plating aluminum in the molten salt bath, a thick aluminum layer can be uniformly formed particularly on the surface of a complicated skeleton structure like the resin molded body having a three-dimensional network structure. A direct current is applied between a cathode of the resin molded body having a surface subjected to the conductive treatment and an anode of an aluminum plate with a purity of 99.0% in the molten salt. As the molten salt, an organic molten salt which is a eutectic salt of an organic halide and an aluminum halide or an inorganic molten salt which is a eutectic salt of an alkaline metal halide and an aluminum halide may be used.

Use of an organic molten salt bath which melts at a relatively low temperature is preferred because it allows plating without the decomposition of the resin molded body, a base material. As the organic halide, an imidazolium salt, a pyridinium salt or the like may be used, and specifically, 1-ethyl-3-methylimidazolium chloride (EMIC) and butylpyridinium chloride (BPC) are preferred. Since the contamination of the molten salt with water or oxygen causes degradation of the molten salt, plating is preferably performed in an atmosphere of an inert gas, such as nitrogen or argon, and in a sealed environment.

The molten salt bath is preferably a molten salt bath containing nitrogen, and particularly an imidazolium salt bath is preferably used. In the case where a salt which melts at a high temperature is used as the molten salt, the dissolution or decomposition of the resin in the molten salt is faster than the growth of a plated layer, and therefore, a plated layer cannot be formed on the surface of the resin molded body. The imidazolium salt bath can be used without having any affect on the resin even at relatively low temperatures.

As the imidazolium salt, a salt which contains an imidazolium cation having alkyl groups at 1,3-position is preferably used, and particularly, aluminum chloride+1-ethyl-3-methylimidazolium chloride ($AlCl_3$+EMIC)-based molten salts are most preferably used because of their high stability and resistance to decomposition. The imidazolium salt bath allows plating of urethane resin foams and melamine resin foams, and the temperature of the molten salt bath ranges from 10° C. to 65° C., and preferably 25° C. to 60° C. With a decrease in temperature, the current density range where plating is possible is narrowed, and plating of the entire surface of a resin molded body becomes more difficult. The failure that a shape of a base resin is impaired tends to occur at a high temperature higher than 65° C.

With respect to molten salt aluminum plating on a metal surface, it is reported that an additive, such as xylene, benzene, toluene or 1,10-phenanthroline, is added to $AlCl_3$-EMIC for the purpose of improving the smoothness of the plated surface. The present inventors have found that particularly in aluminum plating of a resin molded body having a three-dimensional network structure, the addition of 1,10-phenanthroline has characteristic effects on the formation of an aluminum structure. That is, it provides a first characteristic that the smoothness of a plating film is improved and the aluminum skeleton forming the porous body is hardly broken, and a second characteristic that uniform plating can be achieved with a small difference in plating thickness between the surface and the interior of the porous body.

In the case of pressing the completed aluminum porous body or the like, the above-mentioned two characteristics of the hard-to-break skeleton and the uniform plating thickness in the interior and exterior can provide a porous body which has a hard-to-break skeleton as a whole and is uniformly pressed. When the aluminum porous body is used as an electrode material for batteries or the like, it is performed that an electrode is filled with an electrode active material and is pressed to increase its density. However, since the skeleton is often broken in the step of filling the active material or pressing, the two characteristics are extremely effective in such an application.

According to the above description, the addition of an organic solvent to the molten salt bath is preferred, and particularly 1,10-phenanthroline is preferably used. The amount of the organic solvent added to the plating bath preferably ranges from 0.2 to 7 g/L. When the amount is 0.2 g/L or less, the resulting plating is poor in smoothness and brittle, and it is difficult to achieve an effect of decreasing a difference in thickness between the surface layer and the interior. When the amount is 7 g/L or more, plating efficiency is decreased and it is difficult to achieve a predetermined plating thickness.

On the other hand, an inorganic salt bath can also be used as a molten salt to an extent to which a resin is not melted or the like. The inorganic salt bath is a salt of a two-component system, typically $AlCl_3$-XCl (X: alkali metal), or a multi-component system. Such an inorganic salt bath usually has a higher molten temperature than that in an organic salt bath like an imidazolium salt bath, but it has less environmental constraints such as water content or oxygen and can be put to practical use at low cost as a whole. When the resin is a melamine resin foam, an inorganic salt bath at 60° C. to 150° C. is employed because the resin can be used at a higher temperature than a urethane resin foam.

An aluminum structure having a resin molded body as the core of its skeleton is obtained through the above-mentioned steps. In addition, in the above description, the aluminum layer is formed by molten salt plating, but the aluminum layer can be formed by any method of vapor phase methods such as vapor deposition, sputtering and plasma CVD, application of an aluminum paste, and the like.

For some applications such as various filters and a catalyst support, the aluminum structure may be used as a resin-metal composite as it is, but when the aluminum structure is used as a metal porous body without a resin because of constraints resulting from the usage environment, the resin is removed. In the present invention, in order to avoid causing the oxidation of aluminum, the resin is removed through decomposition in a molten salt described below.

(4) Removal of Resin: Treatment by Molten Salt

The decomposition in a molten salt is performed in the following manner. A resin molded body having an aluminum plated layer formed on the surface thereof is dipped in a molten salt, and is heated while applying a negative potential (potential lower than a standard electrode potential of aluminum) to the aluminum layer to remove the resin molded body. When the negative potential is applied to the aluminum layer with the resin molded body dipped in the molten salt, the resin molded body can be decomposed without oxidizing aluminum.

A heating temperature can be appropriately selected in accordance with the type of the resin molded body. When the resin molded body is urethane, a temperature of the molten salt bath needs to be 380° C. or higher since decomposition of urethane occurs at about 380° C., but the treatment needs to be performed at a temperature equal to or lower than the melting point (660° C.) of aluminum in order to avoid melting aluminum. A preferred temperature range is 500° C. or higher and 600° C. or lower.

A negative potential to be applied is on the minus side of the reduction potential of aluminum and on the plus side of the reduction potential of the cation in the molten salt. In this manner, an aluminum porous body which has continuous pores, a thin oxide layer on the surface and an oxygen content as low as 3.1 mass % or less can be obtained.

The molten salt used in the decomposition of the resin may be a halide salt of an alkali metal or alkaline earth metal such that the electrode potential of the aluminum layer is lower. More specifically, the molten salt preferably contains one or more selected from the group consisting of lithium chloride (LiCl), potassium chloride (KCl) and sodium chloride (NaCl), and more preferably contains a eutectic molten salt in which the melting point is lowered by mixing two or more of them. In this manner, an aluminum porous body which has continuous pores, a thin oxide layer on the surface and an oxygen content as low as 3.1 mass % or less can be obtained.

As the aluminum porous body, an aluminum porous body having a porosity of 40 to 98% and a cell diameter of 50 to 1000 μm is preferably used. The aluminum porous body more preferably has a porosity of 80 to 98% and a cell diameter of 350 to 900 μm.

2. Preparation of Slurry

Next, a method of preparing a slurry will be described, taking a positive electrode for a lithium secondary battery as an example. An active material powder such as $LiCoO_2$, a binder such as PVDF and further a conduction aid such as acetylene black are mixed in a predetermined ratio to prepare a mixture, and a predetermined amount of a solvent such as N-methyl-2-pyrrolidone (NMP) is added to the mixture, and the resulting mixture is kneaded to prepare a slurry. The mixing ratio of these materials is appropriately determined in consideration of the capacity and conductivity of the electrode, the viscosity of the slurry, and the like.

3. Preparation of Electrode for Lithium Secondary Battery

Figure 2:
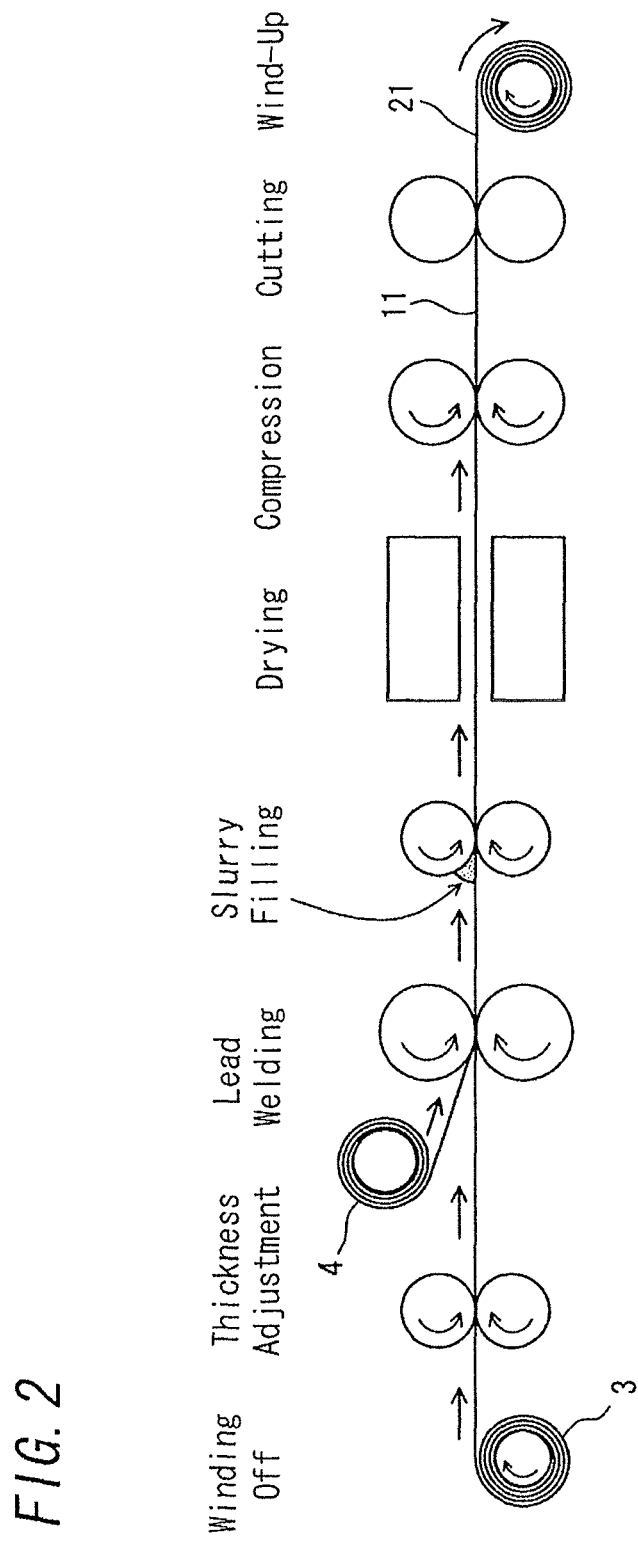
FIG. 2 is a view illustrating a production procedure of an electrode for a lithium secondary battery of an embodiment of the present invention.

Next, a preparation of an electrode for an electrochemical element will be described, taking a preparation of an electrode for a lithium secondary battery as an example. FIG. 2 is a view illustrating a production procedure of the electrode for a lithium secondary battery of the present embodiment.

As shown in FIG. 2, the electrode for a lithium secondary battery is produced by undergoing a thickness adjustment step, a lead welding step, a filling step, a drying step, a compressing step, a longitudinally cutting step, a wind-up step and a transversely cutting step in turn from the upstream side.

(1) Thickness Adjustment Step

An aluminum porous body 3 produced based on the above-mentioned production method is wound off and the thickness of the aluminum porous body 3 is adjusted to a predetermined thickness through a roll for thickness adjustment by roller pressing.

(2) Lead Welding Step

Then, a lead 4 is wound off, and the lead 4 is welded to the aluminum porous body 3, the thickness of which is adjusted, to prepare a current collector.

(3) Filling Step

Next, a slurry prepared based on the above-mentioned preparation method is filled into continuous pores of the current collector by using a roll.

(4) Drying Step

Next, the current collector is passed through a drying furnace to evaporate the solvent contained in the slurry.

(5) Compressing Step

Next, the current collector is compressed to a predetermined thickness by passing through a roll, and thereby a void is made small and the filling density of the mixture is adjusted to thereby prepare a precursor 11.

(6) Longitudinally Cutting Step and Wind-Up Step

Then, the precursor 11 is cut (slit) in the longitudinal direction and separated in the transverse direction to prepare a long electrode 21 for a lithium secondary battery and the long electrode 21 is wound up.

Figure 3:
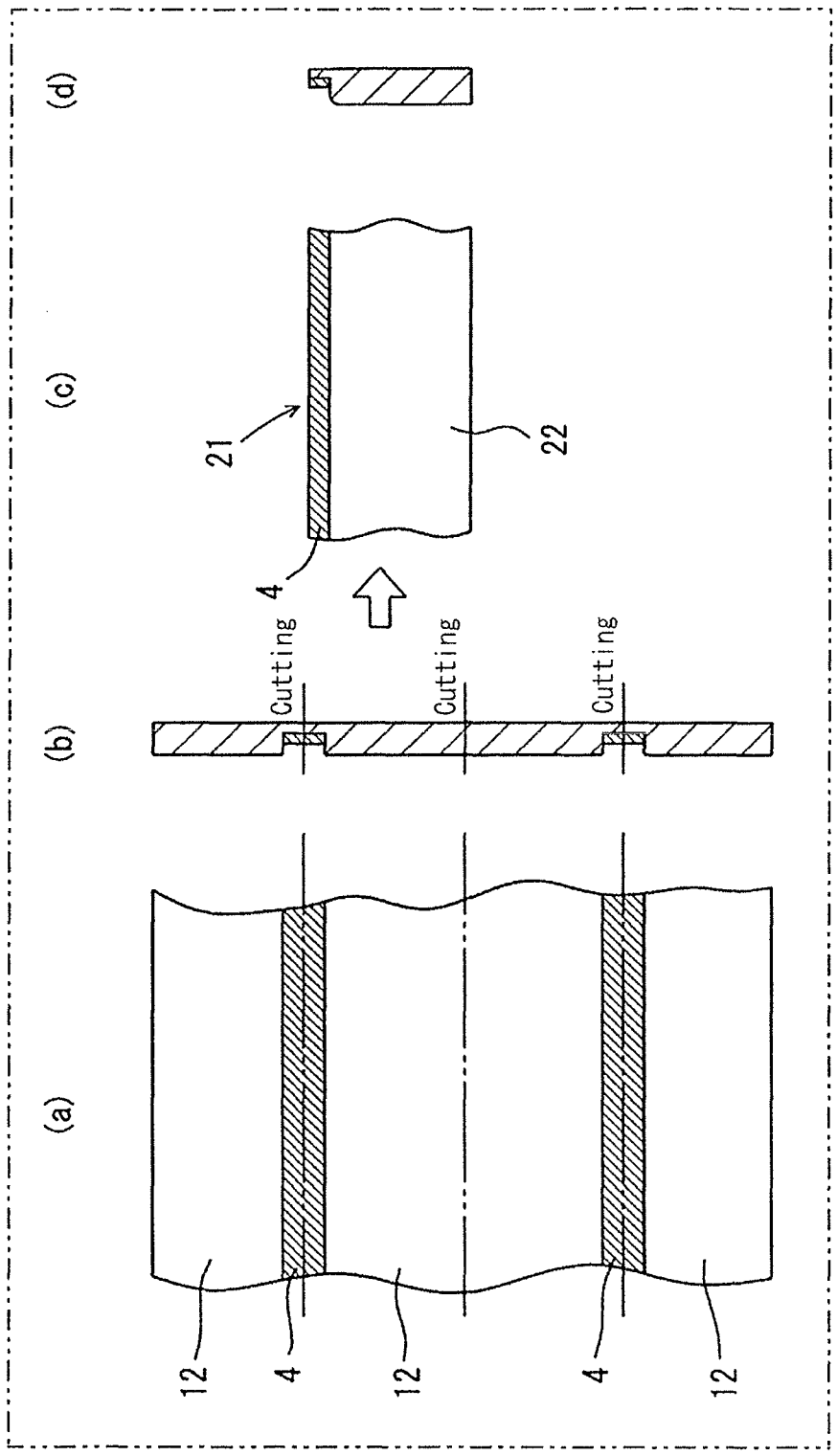
FIG. 3 is a view schematically illustrating the state where a precursor of the electrode for a lithium secondary battery is cut in an embodiment of the present invention.
Figure 4:
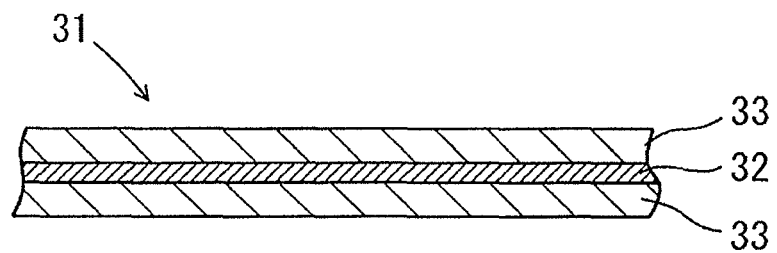
FIG. 4 is a sectional view schematically showing an embodiment of a conventional electrode for a lithium secondary battery.

FIG. 3 is a view schematically illustrating the state where a precursor of the electrode for a lithium secondary battery is cut in the present embodiment, and (a) and (b) in FIG. 3 are respectively a plan view and a sectional view before cutting, and (c) and (d) in FIG. 3 are respectively a plan view and a sectional view after cutting. In FIG. 3, reference numerals 12, 22 represent an electrode main body (part filled with the mixture). As shown in FIG. 3, the precursor is cut at the center of a width and that of the lead 4 to prepare electrodes 21 for a lithium secondary battery.

(7) Transversely Cutting Step

Next, the long electrode 21 for a lithium secondary battery is wound off and cut into a predetermined length.

The method for producing an electrode for a lithium secondary battery has been described above, but the present invention can also be applied to electrodes for other lithium batteries such as a lithium primary battery and further to electrodes for an electric double layer capacitor, a lithium-ion capacitor and a molten salt battery.

[B] Electrochemical Element

Next, an electrochemical element, in which an electrode for an electrochemical element thus prepared is used, will be specifically described separately in the case of a lithium battery, in the case of an electric double layer capacitor, in the case of a lithium-ion capacitor and in the case of a sodium battery.

1. Lithium Battery

First, features of a positive electrode for a lithium battery thus prepared by use of the aluminum porous body will be described, and thereafter a configuration of a lithium secondary battery will be described.

(1) Feature of Positive Electrode for Lithium Battery Prepared by Use of Aluminum Porous Body In a conventional positive electrode for a lithium secondary battery, an electrode formed by applying an active material to the surface of an aluminum foil (current collector) is used. Though a lithium secondary battery has a higher capacity than a nickel-metal hydride battery or a capacitor, a further increase in capacity is required in the automobile applications. Therefore, in order to increase a battery capacity per unit area, the application thickness of the active material is increased. Further, in order to effectively utilize the active material, the active material needs to be in electrical contact with the aluminum foil, a current collector, and therefore, the active material is mixed with a conduction aid to be used.

In contrast, in the present invention, the aluminum porous body is used as a current collector and an electrode filled with the active material mixed with a conduction aid and a binder is used. This aluminum porous body has a high porosity and a large surface area per unit area. As a result of this, a contact area between the current collector and the active material is increased, and therefore, the active material can be effectively utilized, the battery capacity can be improved, and the amount of the conduction aid to be mixed can be decreased.

As described above, the lithium secondary battery, in which the aluminum porous body is used for the current collector, can have an increased capacity even with a small electrode area, and therefore the lithium secondary battery can have a higher energy density than a conventional lithium secondary battery using an aluminum foil.

The effects of the present invention in a secondary battery has been mainly described above, but the effects of the present invention in a primary battery is the same as that in the secondary battery, and a contact area is increased when the aluminum porous body is filled with the active material and a capacity of the primary battery can be improved.

(2) Configuration of Lithium Secondary Battery

Figure 5:
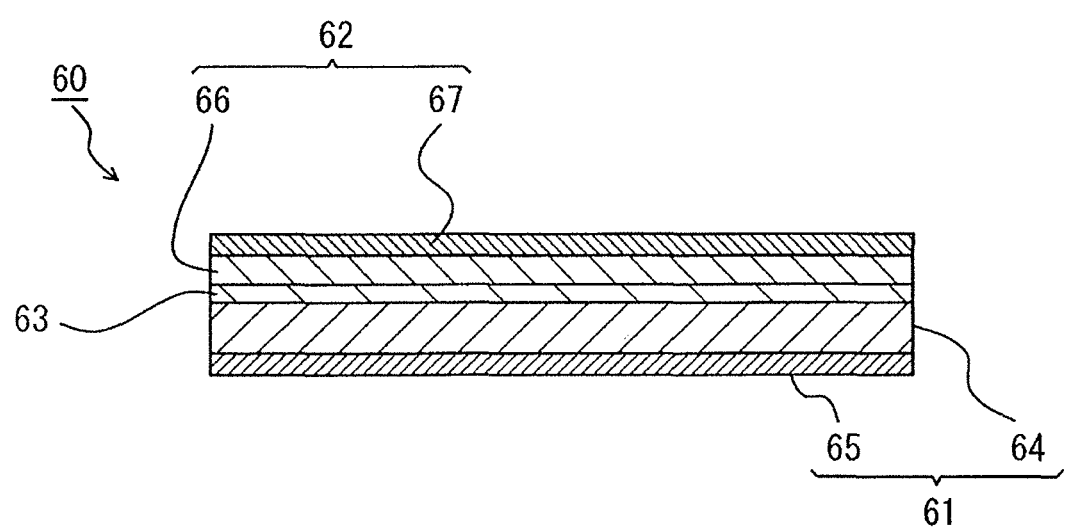
FIG. 5 is a vertical sectional view of a solid-state lithium secondary battery in which an electrode for an electrochemical element according to an embodiment of the present invention is used.

In a lithium secondary battery, there are a case where a solid electrolyte is used and a case where a nonaqueous electrolytic solution is used as an electrolyte. FIG. 5 is a vertical sectional view of a solid-state lithium secondary battery (a solid electrolyte is used as an electrolyte) in which an electrode for an electrochemical element (lithium secondary battery) according to an embodiment of the present invention is used. A solid-state lithium secondary battery 60 includes a positive electrode 61, a negative electrode 62, and a solid electrolyte layer (SE layer) 63 disposed between both electrodes. Further, the positive electrode 61 includes a positive electrode layer (positive electrode body) 64 and a current collector 65 of positive electrode, and the negative electrode 62 includes a negative electrode layer 66 and a current collector 67 of negative electrode.

As described above, a nonaqueous electrolytic solution may be used as the electrolyte, and in this case, a separator (porous polymer film, nonwoven fabric, paper, etc.) is disposed between both electrodes, and both electrodes and the separator are impregnated with the nonaqueous electrolytic solution.

Hereinafter, a positive electrode, a negative electrode and an electrolyte constituting the lithium secondary battery will be described in this order.

(i) Positive Electrode

When an aluminum porous body is used as a current collector of positive electrode for a lithium secondary battery, a material that can extract/insert lithium can be used as a positive electrode active material, and an electrode suitable for a lithium secondary battery can be obtained by filling an aluminum porous body, the thickness of which is previously adjusted, with such a material.

(a) Positive Electrode Active Material

As such a positive electrode active material, for example, lithium cobalt oxide ($LiCoO_2$), lithium nickel dioxide ($LiNiO_2$), lithium cobalt nickel oxide ($LiCo_{0.3}Ni_{0.7}O_2$), lithium manganese oxide ($LiMn_2O_4$), lithium titanium oxide ($Li_4Ti_5O_{12}$), lithium manganese oxide compound ($LiM_yMn_{2-y}O_4$; M=Cr, Co, Ni) or lithium acid can be used. These active materials are used in combination with a conduction aid and a binder.

Transition metal oxides such as conventional lithium iron phosphate and olivine compounds which are compounds ($LiFePO_4$, $LiFe_{0.5}Mn_{0.5}PO_4$) of the lithium iron phosphate can also be used. Further, the transition metal elements contained in these materials may be partially substituted with another transition metal element.

Moreover, as other positive electrode active materials, for example, lithium metal in which the skeleton is a sulfide-based chalcogenide such as $TiS_2$, $V_2S_3$, $FeS$, $FeS_2$ or $LiMS_x$ (M is a transition metal element such as Mo, Ti, Cu, Ni, or Fe, or Sb, Sn or Pb), and a metal oxide such as $TiO_2$, $Cr_3O_8$, $V_2O_5$ or $MnO_2$ can also be used. In addition, the above-mentioned lithium titanium oxide ($Li_4Ti_5O_{12}$) can also be used as a negative electrode active material.

(b) Solid Electrolyte

The aluminum porous body may be additionally filled with a solid electrolyte besides the positive electrode active material as required. An electrode more suitable for a positive electrode for a lithium secondary battery can be attained by filling the aluminum porous body with the positive electrode active material and the solid electrolyte. However, the ratio of the active material to materials filled into the aluminum porous body is preferably adjusted to 50 mass % or more, and more preferably 70 mass % or more from the viewpoint of ensuring a discharge capacity.

A sulfide-based solid electrolyte having high lithium ion conductivity is preferably used for the solid electrolyte, and examples of the sulfide-based solid electrolyte include sulfide-based solid electrolytes containing lithium, phosphorus and sulfur. These sulfide-based solid electrolytes may further contain an element such as O, Al, B, Si or Ge.

Such a sulfide-based solid electrolyte can be obtained by a publicly known method. The sulfide-based solid electrolyte can be obtained by, for example, a method in which lithium sulfide ($Li_2S$) and diphosphorus pentasulfide ($P_2S_5$) are prepared as starting materials, $Li_2S$ and $P_2S_5$ are mixed in proportions of about 50:50 to about 80:20 in terms of mole ratio, and the resulting mixture is fused and quenched (melting and rapid quenching method) and a method of mechanically milling the quenched product (mechanical milling method).

The sulfide-based solid electrolyte obtained by the above-mentioned method is amorphous. The sulfide-based solid electrolyte can also be utilized in this amorphous state, but it may be subjected to a heat treatment to form a crystalline sulfide-based solid electrolyte. It can be expected to improve lithium ion conductivity by this crystallization.

(c) Conduction Aid and Binder

When a mixture (active material and solid electrolyte) of the above active material is filled into the aluminum porous body, a conduction aid or a binder is added, as required, to form a mixture, and an organic solvent or water is mixed therewith to prepare a slurry of a positive electrode mixture.

As the conduction aid, for example, carbon black such as acetylene black (AB) or Ketjen Black (KB), or carbon fibers such as carbon nano tubes (CNT) may be used.

As the binder, for example, polyvinylidene fluoride (PVDF), polytetrafluoroethylene (PTFE), polyvinyl alcohol (PVA), carboxymethyl cellulose (CMC), xanthan gum and the like can be used.

(d) Solvent

As a solvent used in preparing the slurry of a positive electrode mixture, as described above, an organic solvent or water can be used.

The organic solvent can be appropriately selected as long as it does not adversely affects materials (i.e., an active material, a conduction aid, a binder, and a solid electrolyte as required) to be filled into the aluminum porous body.

As such an organic solvent, for example, n-hexane, cyclohexane, heptane, toluene, xylene, trimethylbenzene, dimethyl carbonate, diethyl carbonate, ethyl methyl carbonate, propylene carbonate, ethylene carbonate, butylene carbonate, vinylene carbonate, vinyl ethylene carbonate, tetrahydrofuran, 1,4-dioxane, 1,3-dioxolan, ethylene glycol, N-methyl-2-pyrrolidone and the like can be used.

Further, when water is used as a solvent, a surfactant may be used for enhancing filling performance.

(e) Filling of Slurry

As a method of filling the prepared slurry of a positive electrode mixture, publicly known methods such as a method of filling by immersion or a coating method can be employed. Examples of the coating method include a roll coating method, an applicator coating method, an electrostatic coating method, a powder coating method, a spray coating method, a spray coater coating method, a bar coater coating method, a roll coater coating method, a dip coater coating method, a doctor blade coating method, a wire bar coating method, a knife coater coating method, a blade coating method, and a screen printing method.

(ii) Negative Electrode

For a negative electrode, a foil, a punched metal or a porous body of copper or nickel is used as a current collector and a negative electrode active material such as graphite, lithium titanium oxide ($Li_4Ti_5O_{12}$), an alloy of Sn or Si, lithium metal or the like is used. The negative electrode active material is also used in combination with a conduction aid and a binder.

(iii) Electrolyte

As described above, in a lithium secondary battery, there are a case where a solid electrolyte is used and a case where a nonaqueous electrolytic solution is used as an electrolyte As a solid electrolyte, the respective solid electrolytes described above are used.

As a nonaqueous electrolytic solution, an electrolytic solution obtained by dissolving a supporting salt in a polar aprotic organic solvent is used. As such a polar aprotic organic solvent, for example, ethylene carbonate, diethyl carbonate, dimethyl carbonate, propylene carbonate, γ-butyrolactone or sulfolane is used. As the supporting salt, lithium tetrafluoroborate, lithium hexafluorophosphate, an imide salt or the like is used. The concentration of the supporting salt serving as an electrolyte is preferably higher, but a supporting salt having a concentration of about 1 mol/L is generally used since there is a limit of dissolution.

2. Electric Double Layer Capacitor

Figure 6:
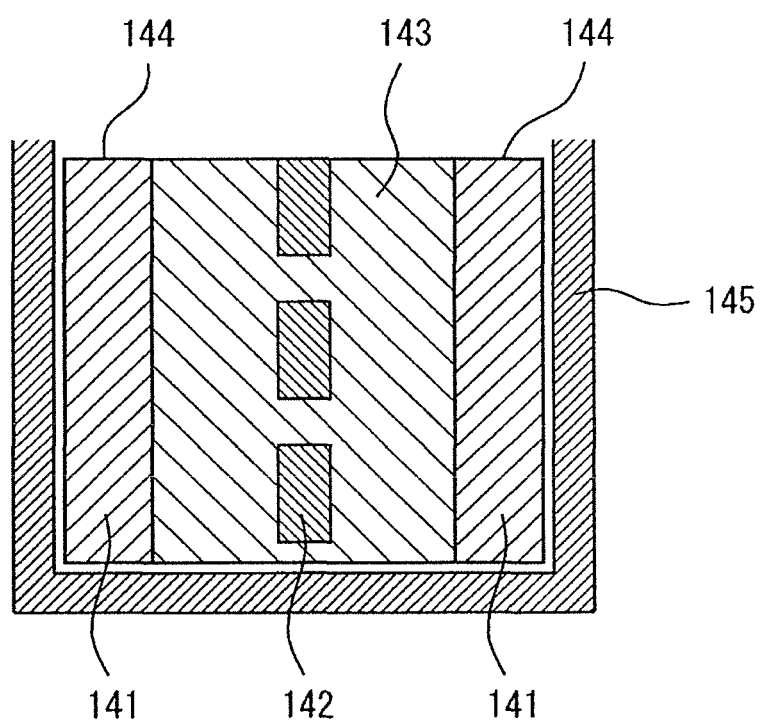
FIG. 6 is a schematic sectional view of an electric double layer capacitor in which an electrode for an electrochemical element according to an embodiment of the present invention is used.

FIG. 6 is a schematic sectional view showing an example of an electric double layer capacitor in which an electrode for an electrochemical element (electric double layer capacitor) according to an embodiment of the present invention is used. An electrode material formed by supporting an electrode active material (activated carbon) on an aluminum porous body is disposed as a polarizable electrode 141 in an organic electrolytic solution 143 partitioned with a separator 142. The polarizable electrode 141 is connected to a lead wire 144, and all these components are housed in a case 145.

When the aluminum porous body is used as a current collector, the surface area of the current collector is increased and a contact area between the current collector and activated carbon as an active material is increased, and therefore, an electric double layer capacitor that can realize a high output and a high capacity can be obtained.

(1) Preparation of Electrode

In order to produce an electrode for an electric double layer capacitor, a current collector of the aluminum porous body is filled with the activated carbon as an active material. The activated carbon is used in combination with a conduction aid and a binder, and a solid electrolyte as required.

(i) Active Material (Activated Carbon)

In order to increase the capacity of the electric double layer capacitor, the amount of the activated carbon as a main component is preferably in a large amount, and the amount of the activated carbon is preferably 90% or more in terms of the composition ratio after drying (after removing a solvent). The conduction aid and the binder are necessary, but the amounts thereof are preferably as small as possible because they are causes of a reduction in capacity and further the binder is a cause of an increase in internal resistance. Preferably, the amount of the conduction aid is 10 mass % or less and the amount of the binder is 10 mass % or less.

When the surface area of the activated carbon is larger, the capacity of the electric double layer capacitor is larger, and therefore, the activated carbon preferably has a specific surface area of 1000 $m^2/g$ or more. As a material of the activated carbon, a plant-derived palm shell, a petroleum-based material or the like may be used. In order to increase the surface area of the activated carbon, the material is preferably activated by use of steam or alkali.

(ii) Other Additives

As the conduction aid, for example, carbon black such as acetylene black (AB) or Ketjen Black (KB), or carbon fibers such as carbon nano tubes (CNT) may be used.

As the binder, for example, polyvinylidene fluoride (PVDF), polytetrafluoroethylene (PTFE), polyvinyl alcohol (PVA), carboxymethyl cellulose (CMC), xanthan gum and the like can be used.

A slurry of an activated carbon paste is prepared by mixing an organic solvent or water as a solvent with a mixture composed of the above active material and other additives.

The organic solvent can be appropriately selected as long as it does not adversely affect materials (i.e., an active material, a conduction aid, a binder, and a solid electrolyte as required) to be filled into the aluminum porous body.

As such an organic solvent, for example, n-hexane, cyclohexane, heptane, toluene, xylene, trimethylbenzene, dimethyl carbonate, diethyl carbonate, ethyl methyl carbonate, propylene carbonate, ethylene carbonate, butylene carbonate, vinylene carbonate, vinyl ethylene carbonate, tetrahydrofuran, 1,4-dioxane, 1,3-dioxolan, ethylene glycol, N-methyl-2-pyrrolidone and the like can be used.

Further, when water is used as a solvent, a surfactant may be used for enhancing filling performance.

(iii) Filling of Slurry

The prepared activated carbon paste (slurry) is filled into the current collector of the above-mentioned aluminum porous body, the thickness of which is previously adjusted, and dried, and its density is increased by compressing by roller pressing or the like as required to obtain an electrode for an electric double layer capacitor.

As a method of filling the activated carbon paste, publicly known methods such as a method of filling by immersion or a coating method can be employed. Examples of the coating method include a roll coating method, an applicator coating method, an electrostatic coating method, a powder coating method, a spray coating method, a spray coater coating method, a bar coater coating method, a roll coater coating method, a dip coater coating method, a doctor blade coating method, a wire bar coating method, a knife coater coating method, a blade coating method, and a screen printing method.

(2) Preparation of Electric Double Layer Capacitor

The electrode obtained in the above-mentioned manner is punched out into an appropriate size to prepare two sheets, and these two electrodes are opposed to each other with a separator interposed therebetween. A porous film or nonwoven fabric made of cellulose or a polyolefin resin is preferably used for the separator. Then, the electrodes are housed in a cell case by use of required spacers, and impregnated with an electrolytic solution. Finally, a lid is put on the case with an insulating gasket interposed between the lid and the case and is sealed, and thereby an electric double layer capacitor can be prepared.

When a nonaqueous material is used, materials of the electrode and the like are preferably adequately dried for decreasing the water content in the electric double layer capacitor without limit. Preparation of the electric double layer capacitor is performed in low-moisture environments, and sealing may be performed in reduced-pressure environments.

In addition, the above-mentioned method of preparing an electric double layer capacitor is one embodiment, and the method of preparing an electric double layer capacitor is not particularly limited as long as it uses the electrode produced according to the present invention, and the electric double layer capacitor may be prepared by a method other than the above-mentioned method.

Though as the electrolytic solution, both an aqueous system and a nonaqueous system can be used, the nonaqueous system is preferably used since its voltage can be set at a higher level than that of the aqueous system.

As an aqueous electrolyte, for example, potassium hydroxide or the like can be used.

Examples of nonaqueous electrolytes include many ionic liquids in combination of a cation and an anion. As the cation, lower aliphatic quaternary ammonium, lower aliphatic quaternary phosphonium, imidazolium or the like is used, and as the anion, ions of metal chlorides, ions of metal fluorides, and imide compounds such as bis(fluorosulfonyl) imide and the like are known.

Further, as the nonaqueous system, there is a polar aprotic organic solvent, and specific examples thereof include ethylene carbonate, diethyl carbonate, dimethyl carbonate, propylene carbonate, γ-butyrolactone and sulfolane. As a supporting salt in the nonaqueous electrolytic solution, lithium tetrafluoroborate, lithium hexafluorophosphate or the like is used.

3. Lithium-Ion Capacitor

Figure 7:
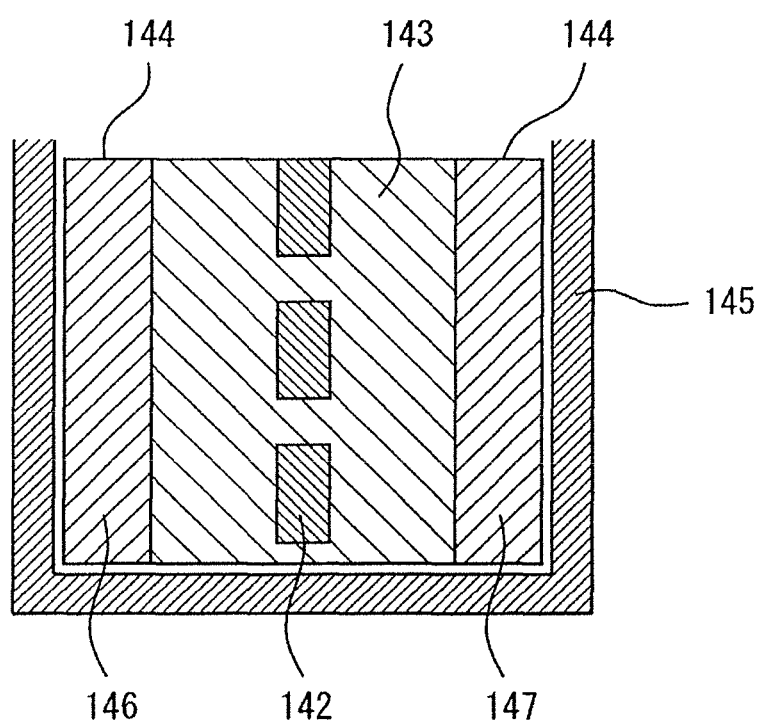
FIG. 7 is a schematic sectional view of a lithium-ion capacitor in which an electrode for an electrochemical element according to an embodiment of the present invention is used.

FIG. 7 is a schematic sectional view showing an example of a lithium-ion capacitor in which an electrode for an electrochemical element (lithium-ion capacitor) according to an embodiment of the present invention is used. In an organic electrolytic solution 143 partitioned with a separator 142, an electrode material formed by supporting a positive electrode active material on an aluminum porous body is disposed as a positive electrode 146 and an electrode material formed by supporting a negative electrode active material on a current collector is disposed as a negative electrode 147. The positive electrode 146 and the negative electrode 147 are connected to a lead wire 144, and all these components are housed in a case 145.

When the aluminum porous body is used as a current collector, the surface area of the current collector is increased, and therefore, even when activated carbon as an active material is applied onto the aluminum porous body in a thin manner, a capacitor that can realize a high output and a high capacity can be obtained.

(1) Preparation of Positive Electrode

In order to produce an electrode (positive electrode) for a lithium-ion capacitor, a current collector of the aluminum porous body is filled with activated carbon as an active material. The activated carbon is used in combination with a conduction aid and a binder, and a solid electrolyte as required.

(i) Active Material (Activated Carbon)

In order to increase the capacity of the lithium-ion capacitor, the amount of the activated carbon as a main component is preferably in a large amount, and the amount of the activated carbon is preferably 90% or more in terms of the composition ratio after drying (after removing a solvent). The conduction aid and the binder are necessary, but the amounts thereof are preferably as small as possible because they are causes of a reduction in capacity and further the binder is a cause of an increase in internal resistance. Preferably, the amount of the conduction aid is 10 mass % or less and the amount of the binder is 10 mass % or less.

When the surface area of the activated carbon is larger, the capacity of the lithium-ion capacitor is larger, and therefore, the activated carbon preferably has a specific surface area of 1000 $m^2/g$ or more. As a material of the activated carbon, a plant-derived palm shell, a petroleum-based material or the like may be used. In order to increase the surface area of the activated carbon, the material is preferably activated by use of steam or alkali.

(ii) Other Additives

As the conduction aid, for example, carbon black such as acetylene black (AB) or Ketjen Black (KB), or carbon fibers such as carbon nano tubes (CNT) may be used.

As the binder, for example, polyvinylidene fluoride (PVDF), polytetrafluoroethylene (PTFE), polyvinyl alcohol (PVA), carboxymethyl cellulose (CMC), xanthan gum and the like can be used.

A slurry of an activated carbon paste is prepared by mixing an organic solvent or water as a solvent with a mixture composed of the above active material and other additives.

As the organic solvent, N-methyl-2-pyrrolidone is often used. Further, when water is used as a solvent, a surfactant may be used for enhancing filling performance.

The organic solvent besides N-methyl-2-pyrrolidone can be appropriately selected as long as it does not adversely affect materials (i.e., an active material, a conduction aid, a binder, and a solid electrolyte as required) to be filled into the aluminum porous body.

Examples of the organic solvent include n-hexane, cyclohexane, heptane, toluene, xylene, trimethylbenzene, dimethyl carbonate, diethyl carbonate, ethyl methyl carbonate, propylene carbonate, ethylene carbonate, butylene carbonate, vinylene carbonate, vinyl ethylene carbonate, tetrahydrofuran, 1,4-dioxane, 1,3-dioxolan, and ethylene glycol.

(iii) Filling of Slurry

The prepared activated carbon paste (slurry) is filled into the current collector of the above-mentioned aluminum porous body, the thickness of which is previously adjusted, and dried, and its density is increased by compressing by roller pressing or the like as required to obtain an electrode for a lithium-ion capacitor.

As a method of filling the activated carbon paste, publicly known methods such as a method of filling by immersion or a coating method can be employed. Examples of the coating method include a roll coating method, an applicator coating method, an electrostatic coating method, a powder coating method, a spray coating method, a spray coater coating method, a bar coater coating method, a roll coater coating method, a dip coater coating method, a doctor blade coating method, a wire bar coating method, a knife coater coating method, a blade coating method, and a screen printing method.

(2) Preparation of Negative Electrode

A negative electrode is not particularly limited and a conventional negative electrode for lithium secondary batteries can be used, but an electrode, in which an active material is filled into a porous body made of copper or nickel like the foamed nickel described above, is preferable because a conventional electrode, in which a copper foil is used for a current collector, has a small capacity.

Further, in order to perform the operations as a lithium-ion capacitor, the negative electrode is preferably doped with lithium ions in advance.

As a doping method, publicly known methods can be employed. Examples of the doping methods include a method in which a lithium metal foil is affixed to the surface of a negative electrode and this is dipped into an electrolytic solution to dope it, a method in which an electrode having lithium metal fixed thereto is arranged in a lithium-ion capacitor, and after assembling a cell, an electric current is passed between the negative electrode and the lithium metal electrode to electrically dope the electrode, and a method in which an electrochemical cell is assembled from a negative electrode and lithium metal, and a negative electrode electrically doped with lithium is taken out and used.

In any method, it is preferred that the amount of lithium-doping is large in order to adequately decrease the potential of the negative electrode, but the negative electrode is preferably left without being doped by the capacity of the positive electrode because when the residual capacity of the negative electrode is smaller than that of the positive electrode, the capacity of the lithium-ion capacitor becomes small.

(3) Electrolytic Solution

The same nonaqueous electrolytic solution as that used in a lithium secondary battery is used for an electrolytic solution. As the nonaqueous electrolytic solution, an electrolytic solution obtained by dissolving a supporting salt in a polar aprotic organic solvent is used. As such a polar aprotic organic solvent, for example, ethylene carbonate, diethyl carbonate, dimethyl carbonate, propylene carbonate, γ-butyrolactone or sulfolane is used. As a supporting salt, lithium tetrafluoroborate, lithium hexafluorophosphate, an imide salt or the like is used.

(4) Preparation of Lithium-Ion Capacitor

The electrode obtained in the above-mentioned manner is punched out into an appropriate size, and is opposed to the negative electrode with a separator interposed between the punched out electrode and the negative electrode. The negative electrode may be an electrode previously doped with lithium ions, and when the method of doping the negative electrode after assembling a cell is employed, an electrode having lithium metal connected thereto may be arranged in a cell.

A porous film or nonwoven fabric made of cellulose or a polyolefin resin is preferably used for the separator. Then, the electrodes are housed in a cell case by use of required spacers, and impregnated with an electrolytic solution. Finally, a lid is put on the case with an insulating gasket interposed between the lid and the case and is sealed, and thereby a lithium-ion capacitor can be prepared.

Materials of the electrode and the like are preferably adequately dried for decreasing the water content in the lithium-ion capacitor as much as possible. Preparation of the lithium-ion capacitor is performed in low-moisture environments, and sealing may be performed in reduced-pressure environments.

In addition, the above-mentioned method of preparing a lithium-ion capacitor is one embodiment, and the method of preparing a lithium-ion capacitor is not particularly limited as long as it uses the electrode produced according to the present invention, and the lithium-ion capacitor may be prepared by a method other than the above-mentioned method.

4. Molten Salt Battery

The aluminum porous can also be used as an electrode material for molten salt batteries. When the aluminum porous body is used as a positive electrode material, a metal compound such as sodium chromite ($NaCrO_2$) or titanium disulfide ($TiS_2$) into which a cation of a molten salt serving as an electrolyte can be intercalated is used as an active material. The active material is used in combination with a conduction aid and a binder.

As the conduction aid, acetylene black or the like may be used. As the binder, polytetrafluoroethylene (PTFE) and the like may be used. When sodium chromite is used as the active material and acetylene black is used as the conduction aid, the binder is preferably PTFE because PTFE can tightly bind sodium chromite and acetylene black.

The aluminum porous can also be used as a negative electrode material for molten salt batteries. When the aluminum porous body is used as a negative electrode material, sodium alone, an alloy of sodium and another metal, carbon, or the like may be used as an active material. Sodium has a melting point of about 98° C. and a metal becomes softer with an increase in temperature. Thus, it is preferable to alloy sodium with another metal (Si, Sn, In, etc.), and in particular, an alloy of sodium and Sn is preferred because of its easiness of handleability.

Sodium or a sodium alloy can be supported on the surface of the aluminum porous body by electroplating, hot dipping, or another method. Alternatively, a metal (Si, etc.) to be alloyed with sodium may be deposited on the aluminum porous body by plating and then converted into a sodium alloy by charging in a molten salt battery.

Figure 8:
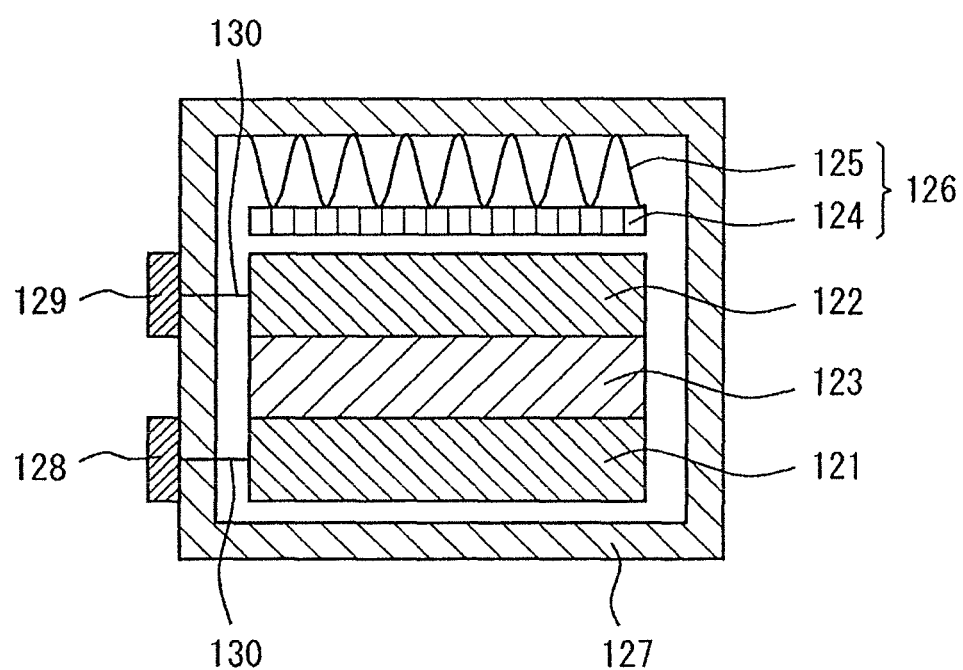
FIG. 8 is a schematic sectional view of a molten salt battery in which an electrode for an electrochemical element according to an embodiment of the present invention is used.

FIG. 8 is a schematic sectional view showing an example of a molten salt battery in which an electrode for an electrochemical element (molten salt battery) according to an embodiment of the present invention is used. The molten salt battery includes a positive electrode 121 in which a positive electrode active material is supported on the surface of an aluminum skeleton of an aluminum porous body, a negative electrode 122 in which a negative electrode active material is supported on the surface of an aluminum skeleton of an aluminum porous body, and a separator 123 impregnated with a molten salt of an electrolyte, which are housed in a case 127.

A pressing member 126 including a presser plate 124 and a spring 125 for pressing the presser plate 124 is arranged between the top surface of the case 127 and the negative electrode 122. By providing the pressing member 126, the positive electrode 121, the negative electrode 122 and the separator 123 can be evenly pressed to be brought into contact with one another even when their volumes have been changed. A current collector (aluminum porous body) of the positive electrode 121 and a current collector (aluminum porous body) of the negative electrode 122 are connected to a positive electrode terminal 128 and a negative electrode terminal 129, respectively, through a lead wire 130.

The molten salt serving as an electrolyte may be various inorganic salts or organic salts which melt at the operating temperature. As a cation of the molten salt, one or more cations selected from alkali metals such as lithium (Li), sodium (Na), potassium (K), rubidium (Rb) and cesium (Cs), and alkaline earth metals such as beryllium (Be), magnesium (Mg), calcium (Ca), strontium (Sr) and barium (Ba) may be used.

In order to decrease the melting point of the molten salt, it is preferable to use a mixture of at least two salts. For example, use of potassium bis(fluorosulfonyl)amide [K—N $(SO_2F)_2$; KFSA] and sodium bis(fluorosulfonyl)amide [Na—N $(SO_2F)_2$; NaFSA] in combination can decrease the battery operating temperature to 90° C. or less.

The molten salt is used in the form of a separator impregnated with the molten salt. The separator is disposed for preventing the contact between the positive electrode and the negative electrode, and may be a glass nonwoven fabric, a porous resin molded body or the like. A laminate of the positive electrode, the negative electrode, and the separator impregnated with the molten salt housed in a case is used as a molten salt battery.

EXAMPLES

Hereinafter, the present invention will be described in more detail with reference to a lithium secondary battery as an example.

[1] Electrode for Lithium Secondary Battery

Example A (A1 to A3)

1. Preparation of Electrode for Lithium Secondary Battery (1) Example A1

(a) Production of Aluminum Porous Body

A urethane foam having a thickness of 1 mm, a porosity of 95% and about 50 pores (cells) per inch was prepared as a resin molded body and cut into a 100 mm×30 mm square, and an aluminum porous body was prepared using the method described in the embodiments. Specifically, the procedures of preparing the aluminum porous body are as follows.

(Formation of Conductive Layer)

The urethane foam was immersed in a carbon suspension and dried to form a conductive layer having carbon particles attaching to the entire surface of the conductive layer. The components of the suspension include graphite and 25% of carbon black, and also include a resin binder, a penetrating agent and an antifoaming agent. The carbon black was made to have a particle diameter of 0.5 µm.

(Molten Salt Plating)

The urethane foam having a conductive layer formed on the surface thereof was loaded as a piece of work in a jig having an electricity supply function, and then the jig was placed in a glove box, the interior of which was adjusted to an argon atmosphere and low moisture (a dew point of −30° C. or lower), and was dipped in a molten salt aluminum plating bath (33 mol % EMIC-67 mol % $AlCl_3$) at a temperature of 40° C. The jig holding the piece of work was connected to the cathode of a rectifier, and an aluminum plate (purity 99.99%) of the counter electrode was connected to the anode. The piece of work was plated by applying a direct current at a current density of 3.6 $A/dm^2$ for 90 minutes to form an aluminum structure in which 150 $g/m^2$ of an aluminum plated layer was formed on the surface of the urethane foam Stirring was performed with a stirrer using a Teflon (registered trademark) rotor. Here, the current density was calculated based on the apparent area of the urethane foam.

The skeleton portion of the obtained aluminum porous body was extracted as a sample and the sample was cut at a cross-section perpendicular to the extending direction of the skeleton and observed. The cross-section has an almost triangular shape and this reflects the structure of the urethane foam used as a core material.

(Removal of Urethane by Decomposition)

Each of the above-mentioned aluminum structures was dipped in a LiCl—KCl eutectic molten salt at a temperature of 500° C., and a negative potential of −1 V was applied to the aluminum structure for 30 minutes. Air bubbles resulting from the decomposition reaction of the polyurethane were generated in the molten salt. Then, the aluminum structure was cooled to room temperature in the atmosphere and was washed with water to remove the molten salt, to thereby obtain an aluminum porous body from which the resin had been removed. The obtained aluminum porous body had continuous pores and a high porosity as with the urethane foam used as a core material.

The obtained aluminum porous body was dissolved in aqua regia and was subjected to an ICP (inductively-coupled plasma) emission spectrometer, and consequently the aluminum purity was 98.5 mass %. Moreover, the carbon content measured by an infrared absorption method after combustion in a high-frequency induction furnace in accordance with JIS-G 1211 was 1.4 mass %. Further, the surface of the aluminum porous body was analyzed at an accelerating voltage of 15 kV by using EDX, and consequently it was confirmed that a peak of oxygen was little observed, and the oxygen amount in the aluminum porous body was equal to or lower than the detection limit (3.1 mass %) of the EDX.

(b) Thickness Adjustment Step

The thickness of the aluminum porous body was adjusted to 0.4 mm by use of roller pressing.

(c) Filling Step

LiCoO$_2$ (active material), acetylene black (conduction aid) and PVDF (binder) were mixed in proportions of 96:2=2 in terms of weight ratio, and the resulting mixture was formed into to a slurry by adding NMP in an amount of 80 parts by weight to 100 parts by weight of the resulting mixture. The slurry was filled into the aluminum porous body by a roll coating method and the extra slurry attaching to a surface was removed with a blade.

(d) Drying Step

The aluminum porous body filled with the active material was dried at 120° C. for 60 minutes to prepare an aluminum porous body filled with the active material.

(e) Compressing Step

Thereafter, the thickness of the aluminum porous body was adjusted to 0.2 mm through compression forming by roll pressing.

(2) Example A2

A positive electrode was prepared in the same manner as in Example 1 except for adjusting the thickness of the aluminum porous body to 0.6 mm and the thickness thereof after compression forming to 0.5 mm in the thickness adjustment of the aluminum porous body.

(3) Example A3

A positive electrode was prepared in the same manner as in Example 1 except for adjusting the thickness of the aluminum porous body to 0.9 mm and the thickness after compression forming of the aluminum porous body filled with the active material to 0.5 mm in the thickness adjustment of the aluminum porous body.

2. Measurement of Capacity (1) Measurement Method

Charge capacities of Examples A1 to A3 were calculated based on the amounts of the active materials of Examples A1 to A3

(2) Results of Measurement

The results of measurement are shown in Table 1.

TABLE 1

|  | Example A1 | Example A2 | Example A3 |
|---|---|---|---|
| Thickness of aluminum porous body after thickness adjustment (mm) | 0.4 | 0.6 | 0.9 |
| Thickness of aluminum porous body after compression (mm) | 0.2 | 0.5 | 0.5 |
| Charge capacity (mAh/cc) | 204 | 208 | 210 |

From Table 1, it could be confirmed that electrodes having various capacities can be prepared by only adjusting the thickness of the aluminum porous body.

Example B (1) Preparation of Aluminum Porous Body

An aluminum porous body having a width of 1 m and a length of 100 m was prepared by using a polyurethane foam having a thickness of 1.4 mm, a porosity of 97% and a cell diameter of about 450 μm.

(2) Filling Process

The following filling process was continuously carried out by use of the above-mentioned long aluminum porous body.
(a) Thickness Adjustment Step
A thickness of the aluminum porous body was adjusted to 1.2 mm by use of roller pressing.
(b) Filling Step
LiCoO$_2$, acetylene black and PVDF were mixed in proportions of 88:6:6 in terms of weight ratio, and the resulting mixture was formed into a slurry by adding NMP in an amount of 80 parts by weight to 100 parts by weight of the resulting mixture. The slurry was filled into the aluminum porous body by a roll coating method and the extra slurry attaching to a surface was removed with a blade.
(c) Drying Step
The aluminum porous body filled with the active material was dried at 120° C. for 60 minutes to prepare an aluminum porous body filled with the active material.
(d) Compressing Step
Thereafter, the thickness of the aluminum porous body was adjusted to 0.8 mm through compression forming by roll pressing, and then the aluminum porous body was cut into a size of 48 mm in width and 180 mm in length to obtain an electrode with a charge capacity of 12 mAh/cm$^2$.

It could be confirmed from the present example that an electrode for a lithium secondary battery having a predetermined charge capacity can be produced at low cost by continuously filling a long aluminum porous body with an active material, and then cutting the aluminum porous body.

[2] Battery Pack

Hereinafter, rectangular layered battery cells, in which positive and negative electrodes produced by using the aluminum porous body are layered, were combined to prepare a battery pack, and the battery pack was compared with a battery pack prepared by combining conventional cylindrical batteries.
1. Preparation of Positive Electrode
An aluminum porous body having a thickness of 5 mm was prepared by using the same method as that described in Example A1. Then, LiNiMnO (LiN$_{1/2}$Mn$_{3/2}$O$_4$), (positive electrode active material), acetylene black (conduction aid) and PVDF (binder) were mixed in proportions of 90:5:5 in terms of weight ratio, and the resulting mixture was formed into a slurry by adding NMP (solvent) in an amount of 80 parts by weight to 100 parts by weight of the resulting mixture. The slurry was filled into the aluminum porous body, and the thickness of the aluminum porous body was adjusted to 3.4 mm by pressing after drying the slurry. Next, the aluminum porous body was cut into a size of 10×10 cm, and a tab lead was welded to the aluminum porous body to prepare a positive electrode with a capacity density per area of 100 mAh/cm$^2$.
2. Preparation of Negative Electrode
An aluminum porous body having a thickness of 4 mm was prepared by using the same method as that described in Example A1. Then, LTO (lithium titanium oxide: $Li_4Ti_5O_{12}$) (negative electrode active material), acetylene black (conduction aid) and PVDF (binder) were mixed in proportions of 90:5:5 in terms of weight ratio, and the resulting mixture was formed into a slurry by adding NMP (solvent) in an amount of 80 parts by weight to 100 parts by weight of the resulting mixture. The slurry was filled into the aluminum porous body, and the thickness of the aluminum porous body was adjusted to 2.7 mm by pressing after drying the slurry. Next, the aluminum porous body was cut into a size of 10×10 cm, and a tab lead was welded to the aluminum porous body to prepare a negative electrode with a capacity density per area of 120 mAh/cm².

3. Preparation of Battery Cell

First, 10 sheets of positive electrodes and 10 sheets of negative electrodes, respectively prepared in the above description, were prepared and alternately layered with a nonwoven fabric separator interposed therebetween. Then, 400 cc of a solution obtained by dissolving $LiPF_6$ in a concentration of 1 mol/L in a solvent including EC and DEC in proportions of 1 was used for an electrolytic solution, and the resulting cell was sealed with an aluminum laminate to prepare a rectangular layered battery cell (thickness 61 mm). The prepared cell had a voltage of 3.2 V and a capacity of 100 Ah.

4. Preparation of Battery Pack

Next, four prepared cells were connected to one another in series to prepare a battery pack of 12V and 100 Ah. The battery pack had a volume of 2.9 L and a volumetric energy density of 414 Wh/L.

5. Comparison with Conventional Battery Pack

It is generally announced that a lithium secondary battery pack for automobile use using a cylindrical battery of 18650 type has an energy density of 200 to 250 Wh/L, and therefore it was found that the battery pack of the present embodiment can attain the volumetric energy density which is nearly up to two times larger than that of a conventional battery pack, and that when the battery pack of the present embodiment is prepared at the same voltage and the same capacity, its volume can be reduced by up to 51%.

The present invention has been described based on embodiments, but it is not limited to the above-mentioned embodiments. Variations to these embodiments may be made within the scope of identity and equivalence of the present invention.

REFERENCE SIGNS LIST

1 Resin foam molded body
2 Aluminum (Al)-plated layer
3 Aluminum porous (Al) body
4 Lead
11 Precursor
12, 22 Electrode main body
21, 31 Electrode for lithium secondary battery
32 Current collector
33 Positive electrode mixture layer
60 Solid-state lithium secondary battery
61 Positive electrode
62 Negative electrode
63 Solid electrolyte layer (SE layer)
64 Positive electrode layer
65 Current collector of positive electrode
66 Negative electrode layer
67 Current collector of negative electrode
121, 146 Positive electrode
122, 147 Negative electrode
123, 142 Separator
124 Presser plate
125 Spring
126 Pressing member
127, 145 Case
128 Positive electrode terminal
129 Negative electrode terminal
130, 144 Lead wire
141 Polarizable electrode
143 Organic electrolytic solution

The invention claimed is:

1. A method for producing an electrode for an electrochemical element, comprising:
    a thickness adjustment step of compressing an aluminum porous body having continuous pores with a first roll to thereby adjust the aluminum porous body to a predetermined thickness; and thereafter
    a filling step of filling the continuous pores of the aluminum porous body, the thickness of which has been adjusted, with a slurry including an active material by pressing the slurry into the continuous pores with a second roll,
    a drying step of drying the aluminum porous body filled with the slurry, and
    a compressing step of compressing the dried aluminum porous body to reduce a space formed by evaporation of solvent in the slurry, prior to a cutting step.

2. The method for producing an electrode for an electrochemical element according to claim 1, comprising the cutting step of cutting the aluminum porous body filled with the active material to a predetermined length.

3. The method for producing an electrode for a electrochemical element according to claim 1, wherein the aluminum porous body is an aluminum porous body in which the oxygen amount of its surface, quantified at an accelerating voltage of 15 kV by EDX analysis, is 3.1 mass % or less.

4. The method for producing an electrode for a electrochemical element according to claim 2, wherein the aluminum porous body is an aluminum porous body in which the oxygen amount of its surface, quantified at an accelerating voltage of 15 kV by EDX analysis, is 3.1 mass % or less.

* * * * *